United States Patent
Xia et al.

(10) Patent No.: US 10,555,359 B2
(45) Date of Patent: Feb. 4, 2020

(54) SYSTEM AND METHOD FOR BEAM FAILURE RECOVERY

(71) Applicant: Futurewei Technologies, Inc., Plano, TX (US)

(72) Inventors: Pengfei Xia, San Diego, CA (US); Young Hoon Kwon, Laguna Niguel, CA (US); Bin Liu, San Diego, CA (US)

(73) Assignee: FUTUREWEI TECHNOLOGIES, INC., Plano, TX (US)

( * ) Notice: Subject to any disclaimer, the term of this patent is extended or adjusted under 35 U.S.C. 154(b) by 40 days.

(21) Appl. No.: 15/836,444

(22) Filed: Dec. 8, 2017

(65) Prior Publication Data
US 2019/0053312 A1  Feb. 14, 2019

Related U.S. Application Data

(60) Provisional application No. 62/544,457, filed on Aug. 11, 2017.

(51) Int. Cl.
*H04W 72/04* (2009.01)
*H04W 76/18* (2018.01)
(Continued)

(52) U.S. Cl.
CPC .......... *H04W 76/18* (2018.02); *H04B 7/0695* (2013.01); *H04B 7/088* (2013.01);
(Continued)

(58) Field of Classification Search
CPC . H04W 76/18; H04W 72/048; H04W 72/046; H04W 74/08; H04W 4/08
See application file for complete search history.

(56) References Cited

U.S. PATENT DOCUMENTS

2015/0208431 A1* 7/2015 Chen .................. H04W 4/08
370/329
2016/0353424 A1* 12/2016 Stirling-Gallacher .................
H04B 7/0626
(Continued)

FOREIGN PATENT DOCUMENTS

WO   2017024516 A1   2/2017

OTHER PUBLICATIONS

Huawei, et al., "Beam Failure Recovery," 3GPP TSG RAN WG1 Meeting #89, R1-1708135, Hangzhou, China, May 15-19, 2017, 9 pages.
(Continued)

*Primary Examiner* — Lakeram Jangbahadur
(74) *Attorney, Agent, or Firm* — Slater Matsil, LLP (57) ABSTRACT

A method for operating a user equipment (UE) includes detecting a failure of a first link between the UE and an access node, and based thereon, detecting a second link between the UE and the access node, sending, to the access node, a beam failure recovery request (BFRQ) on one or more physical random access channel (PRACH) resources associated a third link conveying a reference signal, wherein the third link and the second link are quasi co-located (QCLed), wherein the BFRQ includes a group identifier associated with a UE group including the UE, and monitoring one or more PRACH response opportunities associated with the one or more PRACH resources for a beam failure recovery response (BFRP).

18 Claims, 6 Drawing Sheets

(51) Int. Cl.
  *H04B 7/08*   (2006.01)
  *H04B 7/06*   (2006.01)
  *H04L 5/00*   (2006.01)
  *H04W 74/08*  (2009.01)
  *H04W 4/08*   (2009.01)

(52) U.S. Cl.
  CPC ......... *H04L 5/0048* (2013.01); *H04W 72/046* (2013.01); *H04W 72/048* (2013.01); *H04L 5/0053* (2013.01); *H04W 4/08* (2013.01); *H04W 74/08* (2013.01); *H04W 74/0833* (2013.01)

(56) References Cited

U.S. PATENT DOCUMENTS

| | | |
|---|---|---|
| 2018/0191422 A1 | 7/2018 | Xia et al. |
| 2018/0234960 A1* | 8/2018 | Nagaraja .............. H04B 17/318 |
| 2018/0287860 A1 | 10/2018 | Xia et al. |
| 2018/0288756 A1 | 10/2018 | Xia et al. |
| 2018/0302889 A1* | 10/2018 | Guo ................... H04W 72/046 |

OTHER PUBLICATIONS

Qualcomm, Inc., "Uplink Resource for SR," 3GPP TSG-RAN WG1, Meeting #90, R1-1713443, Prague, Czech Republic, Jun. 21-25, 2017, 4 pages.

\* cited by examiner

SYSTEM AND METHOD FOR BEAM FAILURE RECOVERY

This application claims the benefit of U.S. Provisional Application No. 62/544,457, filed on Aug. 11, 2017, entitled "System and Method for Beam Failure Recovery," which application is hereby incorporated herein by reference in its entirety.

TECHNICAL FIELD

The present disclosure relates generally to a system and method for digital communications, and, in particular embodiments, to a system and method for beam failure recovery.

BACKGROUND

One possible deployment scenario for fifth generation (5G) New Radio (NR) system architecture uses high frequency (HF) (6 gigahertz (GHz) and above, such as millimeter wavelength (mmWave)) operating frequencies to exploit greater available bandwidth and less interference then what is available at the congested lower frequencies. However, pathloss is a significant issue. Beamforming may be used to overcome the high pathloss.

Under certain conditions, a user equipment (UE) device may detect that existing communications beam(s) or link(s) between an access node and the UE is not working as expected (i.e., there is a beam or link failure and/or loss) and there is a need to recover from this condition. Therefore, there is a need for mechanisms supporting communications beam failure recovery.

SUMMARY

Example embodiments provide a system and method for beam failure recovery.

In accordance with an example embodiment, a method for operating a user equipment (UE) is provided. The method includes detecting, by the UE, a failure of a first link between the UE and an access node, and based thereon, detecting, by the UE, a second link between the UE and the access node, sending, by the UE to the access node, a beam failure recovery request (BFRQ) on one or more physical random access channel (PRACH) resources associated with a third link conveying a reference signal, wherein the third link and the second link are quasi co-located (QCLed), wherein the BFRQ includes a group identifier associated with a UE group including the UE, and monitoring, by the UE, one or more PRACH response opportunities associated with the one or more PRACH resources for a beam failure recovery response (BFRP).

Optionally, in any of the preceding embodiments, wherein the UE is a group lead UE (GLUE) of the UE group.

Optionally, in any of the preceding embodiments, wherein the method further comprises completing, by the UE, a beam recovery process upon detecting the failure of the first link between the UE and the access node.

Optionally, in any of the preceding embodiments, wherein completing the beam recovery process includes receiving a physical downlink control channel (PDCCH) in accordance with the BFRP.

Optionally, in any of the preceding embodiments, wherein the method further comprises receiving, by the UE from the access node, a group assignment.

Optionally, in any of the preceding embodiments, wherein the group assignment comprises a group identity of the UE group, a UE identity of UEs in the UE group, and a group lead identity of a GLUE in the UE group.

In accordance with an example embodiment, a method for operating a UE is provided. The method includes detecting, by the UE, a failure of a first link between the UE and an access node, and based thereon, monitoring, by the UE, one or more first PRACH response opportunities associated with a UE group including the UE for a first BFRP.

Optionally, in any of the preceding embodiments, wherein the one or more first PRACH response opportunities are associated with the first link.

Optionally, in any of the preceding embodiments, wherein the one or more first PRACH response opportunities are associated with a second link detected between the UE and the access node.

Optionally, in any of the preceding embodiments, wherein the method further comprises detecting, by the UE, that the first BFRP is not received within a specified time window or that the first BFRP is not received by the UE, and based thereon, detecting, by the UE, a second link between the UE and the access node, sending, by the UE to the access node, a BFRQ on one or more PRACH resources associated with a third link conveying a reference signal, wherein the third link and the second link are quasi co-located (QCLed), wherein the BFRQ includes a group identifier associated with a UE group including the UE, and monitoring, by the UE, one or more second PRACH response opportunities associated with the one or more PRACH resources for a second BFRP.

Optionally, in any of the preceding embodiments, wherein the method further comprises completing, by the UE, a beam recovery process upon detecting the failure of the first link between the UE and the access node.

Optionally, in any of the preceding embodiments, wherein the UE is a group member UE (GMUE) of a UE group including the UE.

In accordance with an example embodiment, a UE is provided. The UE includes one or more processors, and a computer readable storage medium storing programming for execution by the one or more processors. The programming including instructions to configure the UE to detect a failure of a first link between the UE and an access node, and based thereon, detect a second link between the UE and the access node, send to the access node a beam failure recovery request (BFRQ) on one or more PRACH resources associated a third link conveying a reference signal, wherein the third link and the second link are QCLed, wherein the BFRQ includes a group identifier associated with a UE group including the UE, and monitor one or more PRACH response opportunities associated with the one or more PRACH resources for a BFRP.

Optionally, in any of the preceding embodiments, wherein the programming includes instructions to configure the UE to complete a beam recovery process upon detecting the failure of the first link between the UE and the access node.

Optionally, in any of the preceding embodiments, wherein the programming includes instructions to configure the UE to receive a PDCCH in accordance with the BFRP.

Optionally, in any of the preceding embodiments, wherein the programming includes instructions to configure the UE to receive from the access node a group assignment.

Optionally, in any of the preceding embodiments, wherein the UE is a group lead UE (GLUE) of the UE group.

In accordance with an example embodiment, a UE is provided. The UE includes one or more processors, and a computer readable storage medium storing programming for execution by the one or more processors. The programming including instructions to configure the UE to detect a failure of a first link between the UE and an access node, and based thereon, monitor one or more first PRACH response opportunities associated with a UE group including the UE for a first BFRP.

Optionally, in any of the preceding embodiments, wherein the one or more first PRACH response opportunities are associated with the first link.

Optionally, in any of the preceding embodiments, wherein the one or more first PRACH response opportunities are associated with a second link detected between the UE and the access node.

Optionally, in any of the preceding embodiments, wherein the programming includes instructions to configure the UE to detect that the first BFRP is not received within a specified time window or that the first BFRP is not received by the UE, and based thereon, detect a second link between the UE and the access node, send a beam failure recovery request (BFRQ) on one or more PRACH resources associated with a third link conveying a reference signal, wherein the third link and the second link are QCLed, wherein the BFRQ includes a group identifier associated with a UE group including the UE, and monitor one or more second PRACH response opportunities associated with the one or more PRACH resources for a second BFRP.

Optionally, in any of the preceding embodiments, wherein the programming includes instructions to configure the UE to complete a beam recovery process upon detecting the failure of the first link between the UE and the access node.

Optionally, in any of the preceding embodiments, wherein the UE is a GMUE of a UE group including the UE.

Practice of the foregoing embodiments enables improved efficiency in the beam failure recovery process by reducing the number of BFRQs transmitted by UEs when a plurality of UEs are suffering beam failures. Rather than each UE that has detected a beam failure, a single UE representing the plurality of UEs sends one BFRQ, thereby reducing the communications overhead.

BRIEF DESCRIPTION OF THE DRAWINGS

For a more complete understanding of the present disclosure, and the advantages thereof, reference is now made to the following descriptions taken in conjunction with the accompanying drawings, in which.

DETAILED DESCRIPTION OF ILLUSTRATIVE EMBODIMENTS

The making and using of the presently example embodiments are discussed in detail below. It should be appreciated, however, that the present disclosure provides many applicable inventive concepts that can be embodied in a wide variety of specific contexts. The specific embodiments discussed are merely illustrative of specific ways to make and use the embodiments, and do not limit the scope of the disclosure.

Figure 1:
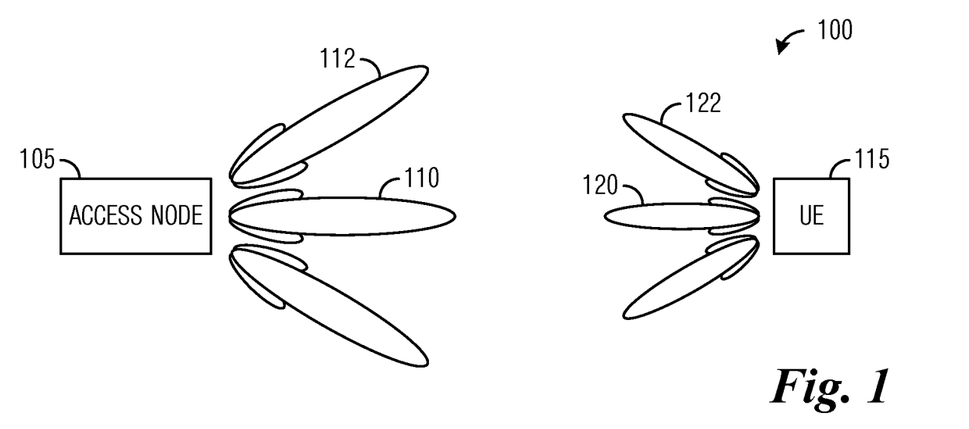
FIG. 1 illustrates an example wireless communications system according to example embodiments described herein.

FIG. 1 illustrates an example wireless communications system 100. Communications system 100 includes an access node 105 serving a user equipment (UE) 115. In a first operating mode, communications to and from UE 115 pass through access node 105. In a second operating mode, communications to and from UE 115 do not pass through access node 105, however, access node 105 typically allocates resources used by UE 115 to communicate. Access nodes may also be commonly referred to as evolved NodeBs (eNBs), base stations, NodeBs, master eNBs (MeNBs), secondary eNBs (SeNBs), next generation (NG) NodeBs (gNBs), master gNBs (MgNBs), secondary gNBs (SgNBs), remote radio heads, access points, and the like, while UEs may also be commonly referred to as mobiles, mobile stations, terminals, subscribers, users, stations, and the like. While it is understood that communications systems may employ multiple access nodes capable of communicating with a number of UEs, only one access node and one UE are illustrated for simplicity.

As discussed previously, pathloss in communications systems operating at high frequency (HF) (6 gigahertz (GHz) and above, such as millimeter wavelength (mm-Wave)) operating frequencies is high, and beamforming may be used to overcome the high pathloss. As shown in FIG. 1, both access node 105 and UE 115 communicate using beamformed transmissions and receptions. As an example access node 105 communicates using a plurality of communications beams, including beams no and 112, while UE 115 communicates using a plurality of communications beams, including beams 120 and 122. It is noted that in some situations, beams or communications beams may also be referred to as links or communications links. As an example, beams and links may be used when describing channels between communicating devices. As another example, a link comprises a transmit beam at a first device and a receive beam at a second device. Therefore, beams or communications beams may be used interchangeably with links or communications links in these situations.

A beam may be a pre-defined set of beamforming weights in the context of codebook-based precoding or a dynamically defined set of beamforming weights in the context of non-codebook based precoding (e.g., Eigen-based beamforming (EBB)). A beam may also be a pre-defined set of phase shift preprocessors combining signals from the antenna array in the radio frequency (RF) domain. It should be appreciated that a UE may rely on codebook-based precoding to transmit uplink signals and receive downlink signals, while a TRP may rely on non-codebook based precoding to form certain radiation patterns to transmit downlink signals and/or receive uplink signals.

In communications system, an access node would generally serve multiple UEs. It may be possible to group some of the UEs served by an access node. An example grouping of UEs may be grouping UEs that share the same downlink transmit beams and/or uplink receive beams at the access node. Another example grouping of UEs may be grouping UEs that have similar pathloss. Yet another example grouping of UEs may be groupings that are located in similar geographical positions. The groupings presented herein are intended for discussion purposes only and other grouping metrics for groupings UEs are possible. Therefore, the presentation of grouping UEs by communications beams, pathloss, and/or geographical positions is intended only for discussion purposes and should not be construed as being limiting to either the spirit or scope of the example embodiments presented herein. Additionally, multiple grouping metrics may be used. As an example, UEs may be grouped by geographical position and downlink transmit beams and/or uplink receive beams, or geographical position and pathloss.

Furthermore, a single UE may be in multiple groups. As an example, a UE may be on an edge of a geographical position that demarks a group boundary and may be in multiple groups that include the geographical position. As another example, a UE may be served by multiple downlink transmit beams and/or uplink receive beams and may be in multiple groups that include the different downlink transmit beams and/or uplink receive beams. As yet another example, a UE may have a pathloss that is near a threshold for multiple groups and is therefore placed in the groups that span the pathloss threshold. Similarly, a UE that is served by multiple access nodes, may be in one or more groups of each of the multiple access nodes.

Figure 2:
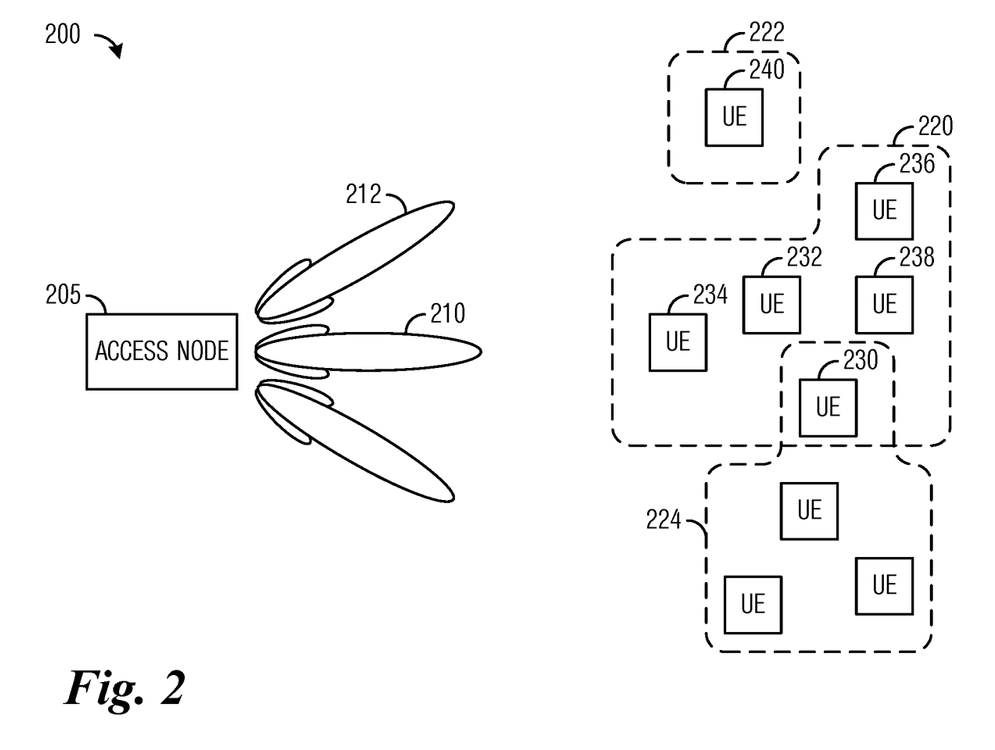
FIG. 2 illustrates an example communications system highlighting UE groups according to example embodiments described herein.

FIG. 2 illustrates an example communications system 200 highlighting UE groups. Communications system 200 includes an access node 205 communicating using communications beams, including communications beam 210 and 212. Access node 205 is serving a plurality of UEs, including UEs 230, 232, 234, 236, 238, and 240. Access node 205 may group the UEs of the plurality of UEs into one or more groups, using one or more grouping metrics. Three UE groups (UE groups 220, 222, and 224) are shown in FIG. 2, but other UE groups are possible. UE group 220 includes UEs 230, 232, 234, 236, and 238, while UE group 222 includes only UE 240 and UE group 224 includes three UEs, one of which (UE 230) is shared with UE group 220.

According to an example embodiment, the UEs of a UE group are categorized. As an illustrative example, each UE of a UE group is categorized into one of two categories. For example, a UE of the plurality of UEs of a UE group that can best represent the UE group is categorized as a group lead UE (GLUE). The GLUE is a UE out of the plurality of UEs of the UE group that may best detect a beam failure event and report a beam failure recovery request (BFRQ). For example, the GLUE is a UE that is located in a geographical center of the UEs of the UE group. As another example, the GLUE is a UE with the highest channel quality of the UEs of the UE group. Alternatively, a UE with a median pathloss (or some other grouping metric value or values) may be the GLUE. In general, the GLUE has the responsibility of performing beam failure detection, sending BFRQs in messages, and monitoring beam failure recovery responses (BFRPs) in messages. A message with a BFRQ may be referred to as a BFRQ message, while a message with a BFRP may be referred to as a BFRP message. As another example, the non-GLUE UEs of the UE group are categorized as group member UEs (GMUEs). In other words, all UEs of the UE group (not including the GLUE) are GMUEs. In general, the GMUEs have the responsibility of performing beam failure detection and monitoring messages for BFRPs. Typically, GMUEs do not participate in sending BFRQs. The other UEs of the UE group (the non-GLUE UEs) may rely on the GLUE for detecting beam failure events and reporting BFRQs. Monitoring for BFRPs may involve attempting to detect BFRPs in resources (e.g., response opportunities) and if a BFRP is detected in a message, the BFRP is received and decoded.

A BFRQ includes a group identifier that identifies the UE group. The group identifier may be an identifier of the UE group assigned to the UE group during the formation of the UE group by an access node, for example. An example of such a group identifier may include a unique value (e.g., numerical value, a text string, a combination of number and text, etc.) assigned by an access node. The group identifier may be an identifier associated with the GLUE of the UE group. An example of such a group identifier may include a media access control (MAC) address of the GLUE, a network identifier of the GLUE (e.g., a radio network temporary identifier (RNTI), a cell RNTI (C-RNTI), a cell identifier, a globally unique temporary identifier (GUTI), an international mobile subscriber identity (IMSI), an international mobile equipment identity (IMEI), and so forth). The BFRQ may also include beam information, such as beam index of a transmit beam, beam index of a receive beam, and so on.

It is noted that although the discussion focuses on BFRQs and BFRPs, the example embodiments presented herein are also operable with link failure recovery requests and link failure recovery responses. Typically, a beam failure occurs, one or more links that include the failed beam also fails. As an example, if beam 210 fails, links that connect access node 205 to each UE of UE group 220 also fail. Hence, it is possible to have a link failure without a corresponding failure in an associated beam. Therefore, the focus on BFRQs and BFRPs should not be construed as being limiting to either the scope or the spirit of the example embodiments.

Furthermore, although the discussion focusses on beam failure recovery, the example embodiments are also operable with link failure recovery, link reconfiguration, and so on. As an example, link reconfiguration may involve a UE detecting that a metric value of an existing link meeting some threshold (e.g., a signal quality measurement dropping below a specified quality threshold or an error rate exceeding a specified error threshold), send a link reconfiguration request in a manner similar to a BFRQ, and monitor link reconfiguration responses in a manner similar to BFRPs. Therefore, the discussion of beam failure and beam failure recovery should not be construed as being limiting to either the scope or the spirit of the example embodiments.

Figure 3:
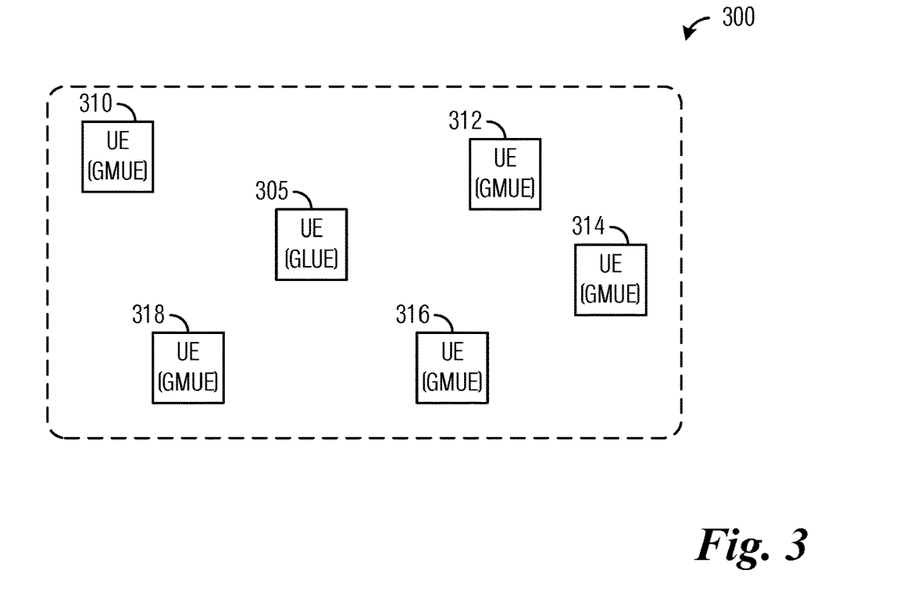
FIG. 3 illustrates an example UE group according to example embodiments described herein.

FIG. 3 illustrates an example UE group 300. UE group 300 includes a plurality of UEs, including UEs 305, 310, 312, 314, 316, and 318. As shown in FIG. 3, UE 305 is the GLUE, while UEs 310, 312, 314, 316, and 318 are GMUEs.

UE 305 may have been categorized as the GLUE because it is approximately in the geographic center of UE group 300.

Figure 4:
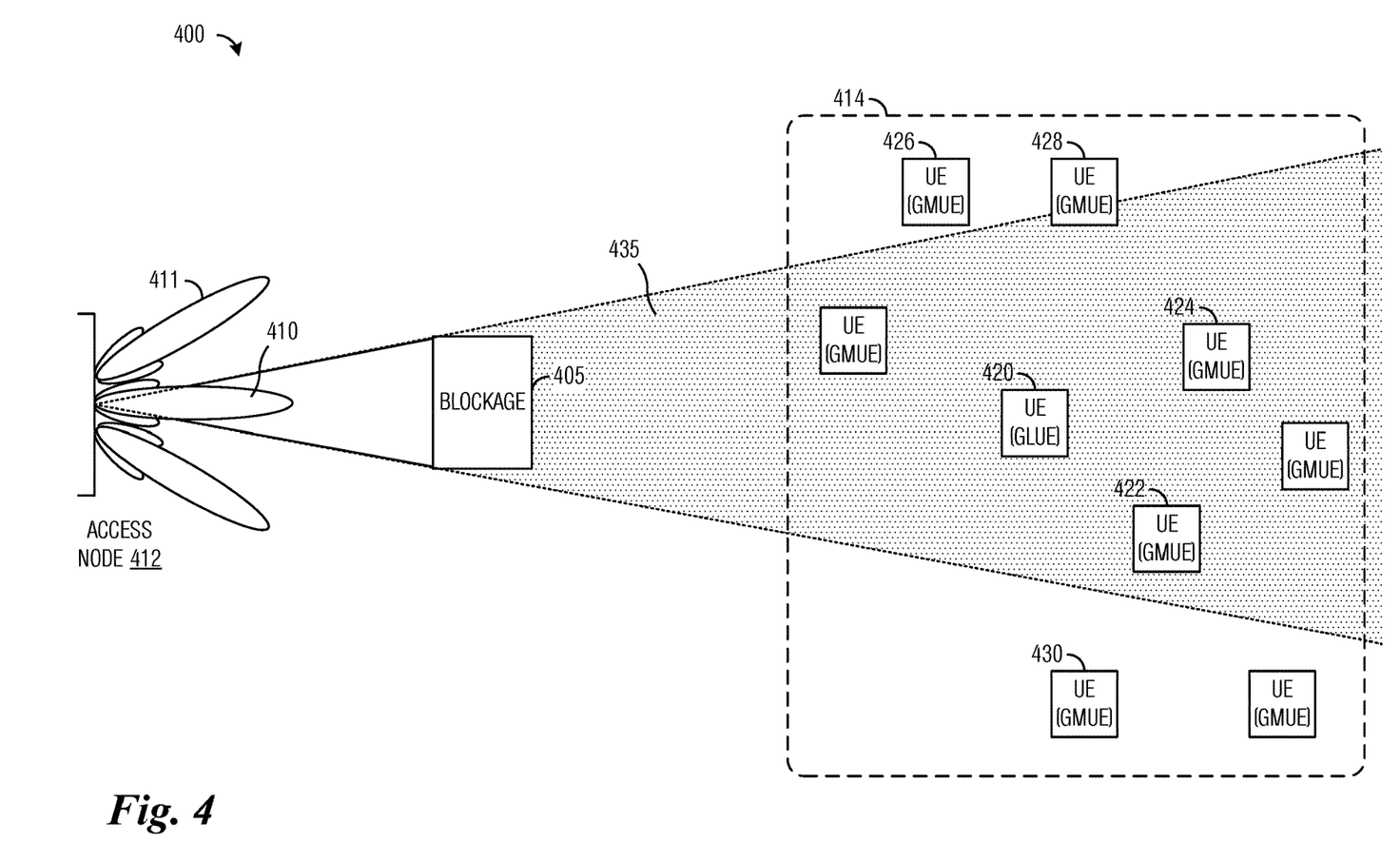
FIG. 4 illustrates a communications system highlighting the effect of a blockage on a beam between an access node and a UE group according to example embodiments described herein.

The beams of 5G NR communications systems are fragile due to the high pathloss present at HF. The beams are easily blocked by objects and/or entities located in or near the path between source and destination. FIG. 4 illustrates a communications system 400 highlighting the effect of a blockage 405 on a beam 410 between an access node 412 and a UE group 414. Access node 412 communicates using beams, including beams 410 and 411. UE group 414 includes a plurality of UEs, such as UEs 420, 422, 424, 426, 428, and 430. As shown in FIG. 4, UE 420 is operating as the GLUE, while the other UEs in UE group 414 are GMUEs.

As shown in FIG. 4, access node 412 is able to communicate to the UEs of UE group 414 using beam 410 when blockage 405 is not present. However, the presence of blockage 405 occludes a significant portion of UE group 414 (shown as shaded region 435), so that a subset of the UEs of UE group (such as UE 420, 422, 424, and potentially UE 428) is not able to communicate with access node 412. UEs located in shaded region 435 are typically unable to communicate with access node 412.

Under existing beam failure procedures, each UE of UE group 414, upon detection of a beam failure, would send a BFRQ to access node 412 and monitor for a BFRP from access node 412. However, due to the nature of a UE group, when one UE of the UE group experiences a beam failure, it is highly likely that when one UE experiences a beam failure that other UEs in the UE group would also experience beam failures. As shown in FIG. 4, for example, five (or potentially six) of the nine UEs of UE group 414 experience beam failures due blockage 405. Therefore, it is inefficient for every UE of one UE group to send BFRQs.

According to an example embodiment, only the GLUE of a UE group, upon detection of a beam failure, sends a BFRQ to an access node serving the UE group. Because the GLUE of the UE group is selected to best represent the UE group, if the GLUE experiences a beam failure, it is likely that other UEs of the UE group will also experience the beam failure. The BFRQ is sent on one or more resources of a physical random access channel (PRACH), for example. After sending the BFRQ, the GLUE monitors for a BFRP in one or more PRACH response opportunities or resources associated with the one or more PRACH resources used to convey the BRFQ.

A PRACH response opportunity may be a resource (or resources) of the communications system assigned to a transmit beam (of the access node serving the UE group) that corresponds to a receive beam of the access node used to receive the BFRQ, which in turn, are associated with the one or more PRACH resources used to convey the BRFQ. In other words, the PRACH response opportunity is a resource (or resources) assigned to a transmit beam that is oriented towards the UE group. In situations when there are multiple transmit beams that are oriented towards the UE group, the PRACH resource opportunity is a resource (or resources) assigned to a transmit beam that corresponds to a transmit beam of the GLUE of the UE group that transmitted the BFRQ, which in turn, are associated with the one or more PRACH resources used to convey the BRFQ. A PRACH resource opportunity may be a resource (or resources) of the communications system assigned to a first transmit beam that is quasi co-located (QCLed) with a second transmit beam (of the access node serving the UE group) that corresponds to a receive beam of the access node used to receive the BFRQ, which in turn, are associated with the one or more PRACH resources used to convey the BRFQ. A detailed discussion of QCL is provided below. A PRACH resource opportunity may be a resource (or resources) of the communications system assigned to the transmission of a reference signal transmitted by the access node.

According to an example embodiment, the GMUEs of a UE group do not send BFRQs, even if they experience beam failures. In an embodiment, the GMUEs of a UE group do not send BFRQs within a specified time window, even if they experience beam failures. Instead, the GMUEs monitor PRACH response opportunities or resources and rely on the GLUE of the UE group to send a BFRQ in response to the beam failure. In a first embodiment, while within the specified time window, the GMUEs monitor all PRACH response opportunities or resources. In a second embodiment, while within the specified time window, the GMUEs monitor one or more PRACH response opportunities or resources that correspond to QCLed reference signals, e.g., a synchronization signal (SS) that is QCLed with a channel state information reference signal (CSI-RS). When two or more reference signals, data signals and/or resources are related in such a way that the two or more reference signals, data signals and/or resources may be viewed as possessing similar characteristics, they are said to possess a quasi co-locate (QCL) relationship. QCL relationships may refer to time, frequency, code, and/or spatial relationships between two or more reference signals, data signals, and/or resources, while spatial QCL refers to only spatial relationships between two or more reference signals, data signals, and/or resources. Spatial QCL information defines such a relationship. QCL information defines a relationship between two signals (reference and/or data signals) such that the two signals may be viewed as possessing similar characteristics. As an example, in a one-to-one association, each CSI-RS signal is associated with one SS signal. It is possible that multiple CSI-RS signals are associated with a single SS, and vice versa. In either embodiment, if a GMUE does not receive a BFRP within the specified time window, the GMUE sends its own BFRQ in one or more PRACH resources and monitors for a BFRP in one or more PRACH response opportunities or resources associated with the one or more PRACH resources used to convey the BRFQ. In other words, each GMUE initially relies on the GLUE of the UE group to send the BFRQ. However, if no BFRP is detected within the specified time window, each GMUE sends in its own BFRQ.

The specified time window may be specified by a technical standard, an operator of the communications system, or determined in collaboration between the communications devices of the communications system. The value of the specified time window may change to meet performance requirements. The possible values for the specified time window may be specified in a technical standard, by an operator of the communications system, or devices may adjust the value to meet operating conditions. As an example, in a relatively uncongested communications system, the specified time window may be small, while the specified time window may be large in a congested communications system.

In an embodiment, if a GMUE receives one or more BFRPs on one or more PRACH response opportunities or resources with the same group identifier, the GMUE treats the one or more BFRPs as the BFRP associated with its beam failure and will it (or them) to monitor future PDCCH(s). If no BFRP on any PRACH response opportunity or resource contains the same group identifier, the GMUE may send its own BFRQ at a later time or alternatively, trigger a higher layer procedure, such as an exception handling procedure.

In another embodiment, a GMUE monitors one or more PRACH response opportunities or resources associated with its own self-determined beam QCLed with a beam used to transmit a SS. If the GMUE receives a BFRP on the one or more PRACH response opportunity or resource containing the same group identifier, the GMUE treats the BFRP as the BFRP associated with its beam failure and uses it to monitor future PDCCH(s). If no BFRP is received on the one or more PRACH response opportunity or resource containing the same group identifier, the GMUE may send its own BFRQ at a later time or alternatively, trigger a higher layer procedure, such as an exception handling procedure.

According to an example embodiment, a GMUE that does not experience a beam failure operates as normal. The GMUE that does not experience a beam failure does not need to monitor any BFRP resources and may continue using its original beam index, listening to the original PDCCH for downlink control messages.

Figure 5A:
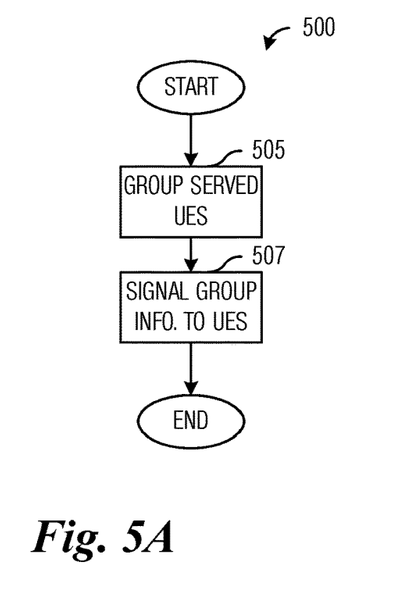
FIG. 5A illustrates a flow diagram of example operations occurring in an access node forming UE groups according to example embodiments described herein.

FIG. 5A illustrates a flow diagram of example operations 500 occurring in an access node forming UE groups. Operations 500 may be indicative of operations occurring in an access node as the access node forms UE groups.

Operations 500 begin with the access node grouping the UEs that it serves (block 505). The access node may use a grouping metric to group the UEs into one or more UE groups. Examples of grouping metrics include communications beams, UE pathloss, geographical positions, and so on. A combination of multiple grouping metrics may also be used by the access node. It is noted that a single UE may be grouped into more than one UE group. In an embodiment, each UE served by the access node is grouped into one of two categories: GLUE or GMUE. The access node signals group information to the UEs served by the access node (block 507). The access node may signal the group information to the UEs in the form of group assignment messages. An example group assignment message may include:
  Group identity information, such as group identifier;
  UE identity information, with all UEs of a single UE group sharing a single UE identity, for example; and
  GLUE identity information, specifying the identity of the GLUE of the UE group.

Figure 5B:
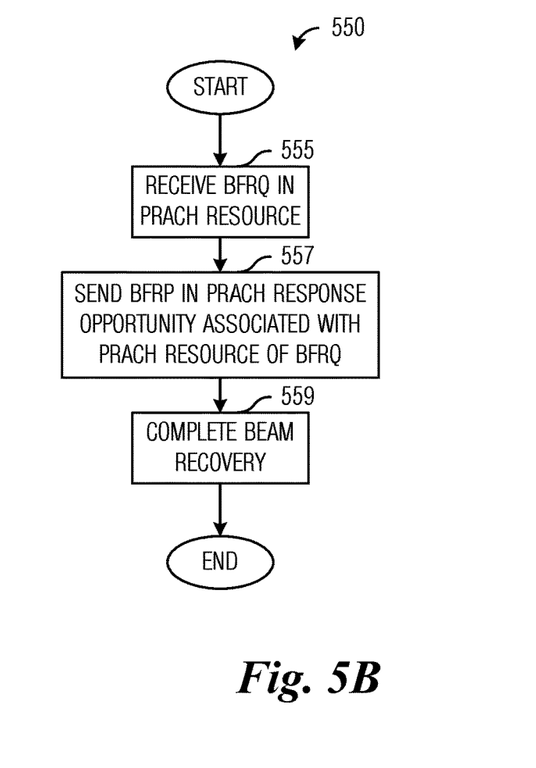
FIG. 5B illustrates a flow diagram of example operations occurring in an access node participating in beam failure recovery according to example embodiments described herein.

FIG. 5B illustrates a flow diagram of example operations 550 occurring in an access node participating in beam failure recovery. Operations 550 may be indicative of operations occurring in an access node as the access node participates in beam failure recovery.

Operations 550 begin with the access node receiving a BFRQ in one or more PRACH resources (block 555). The BFRQ may be received from a GLUE of a UE group. Alternatively, the BFRQ may be received from a GMUE of a UE group. The access node sends a BFRP in a PRACH response opportunity or resource that is associated with the one or more PRACH resources used to convey the BFRQ (block 557). The access node completes beam recovery (block 559).

Figure 6A:
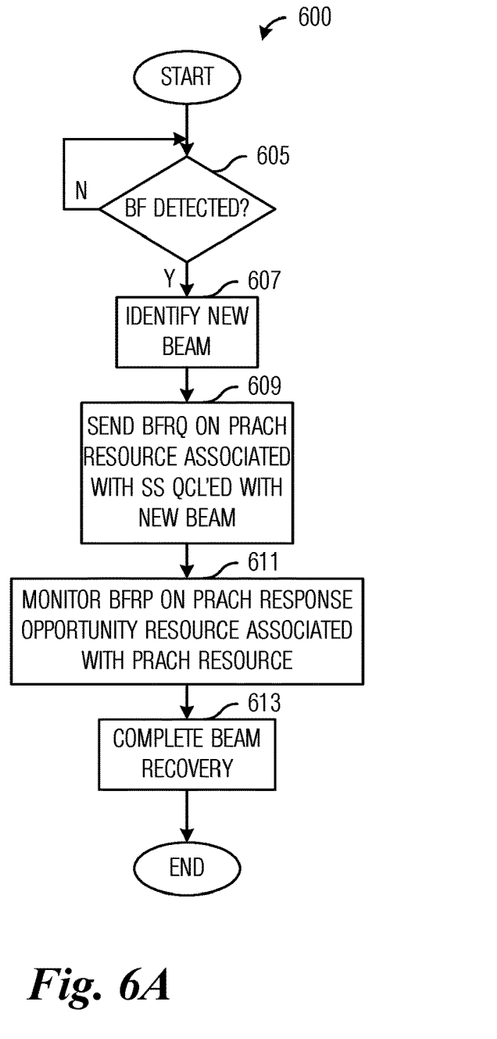
FIG. 6A illustrates a flow diagram of example operations occurring in a GLUE of a UE group according to example embodiments described herein.

FIG. 6A illustrates a flow diagram of example operations 600 occurring in a GLUE of a UE group. Operations 600 may be indicative of operations occurring in a GLUE as the GLUE participates in beam failure recovery.

Operations 600 begin with the GLUE performing a check to determine if a beam failure has been detected (block 605). If a beam failure has not been detected, the GLUE continues to monitor for beam failures. If a beam failure has been detected, the GLUE identifies a new beam (block 607). As an example, the GLUE identifies a new beam used by the access node to send a CSI-RS. The new beam may be referred by its beam index n1 or CSI-RS Index n1 (CRIn1). The new beam (n1 or CRIn1) is QCLed with a beam used to transmit a SS, which may be denoted SSm1. The GLUE sends a BFRQ on one or more PRACH resources associated with SS beam SSm1, which is QCLed with the new beam (block 609). The GLUE monitors for a BFRP on one or more PRACH response opportunities or resources associated with the one or more PRACH resources used to send the BFRQ (block 611). The one or more PRACH response opportunities or resources may be denoted BRPOm1, for example. The GLUE completes beam recovery (block 613). Completion of beam recovery may include rebuilding a physical downlink control channel (PDCCH), and so on.

Figure 6B:
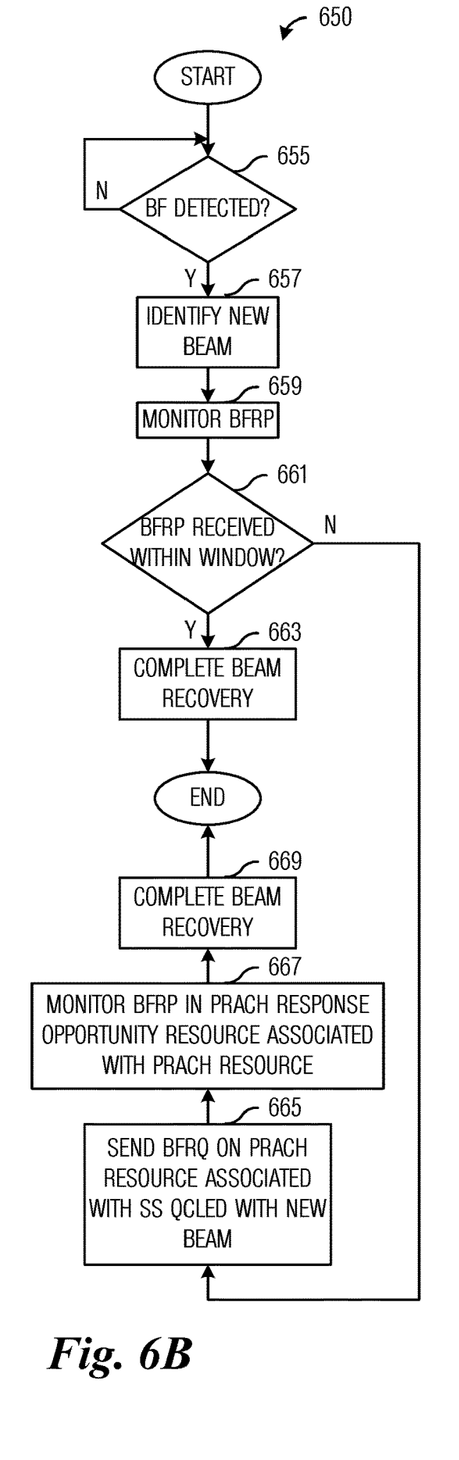
FIG. 6B illustrates a flow diagram of example operations occurring in a GMUE of a UE group according to example embodiments described herein.

FIG. 6B illustrates a flow diagram of example operations 650 occurring in a GMUE of a UE group. Operations 650 may be indicative of operations occurring in a GMUE as the GMUE participates in beam failure recovery.

Operations 650 begin with the GMUE performing a check to determine if a beam failure has been detected (block 655). If a beam failure has not been detected, the GMUE continues to monitor for beam failures. If a beam failure has been detected, the GMUE identifies a new beam (block 657). As an example, the GMUE identifies a new beam used by the access node to send a CSI-RS. The new beam may be referred by its beam index n2 or CSI-RS Index n2 (CRIn2). The new beam (n2 or CRIn2) may be QCLed with the same beam used to transmit a SS (denoted SSm2) as the new beam identified by the GLUE (SSm1). In a first illustrative example, the new beam (n2 or CRIn2) is QCLed with a beam used to transmit a SS (SSm1). In a second illustrative example, the new beam (n2 or CRIn2) is QCLed with a different beam used to transmit a SS, denoted SSm2, which is different from SSm1.

The GMUE monitors for a BFRP (block 659). In a first embodiment, the GMUE monitors for the BFRP in one or more PRACH response opportunities or resources associated with one or more PRACH resources used by the GLUE to transmit the BFRQ. In such a situation, the new beam (n2 or CRIn2) is QCLed with a beam used to transmit a SS (SSm1). In a second embodiment, the GMUE monitors for the BFRP in all PRACH response opportunities or resources associated with the UE group. In such a situation, the new beam (n2 or CRIn2) may or may not be QCLed with the beam used to transmit a SS (SSm1). The GMUE performs a check to determine if a BFRP has been received within a specified time window (block 661). Alternatively, the GMUE may perform a check to determine if a BFRP has been received, without consideration being given to a specified time window. If the BFRP has been received within the specified time window (or if it has been received), the GMUE completes beam recovery (block 663). Completion of beam recovery may include rebuilding a physical downlink control channel (PDCCH), and so on.

If the BFRP has not been received within the specified time window (or if it has not been received at all), the GMUE determines that it is to send a BFRQ on its own (perhaps it is the only UE that has experienced a beam failure, for example), and sends a BFRQ on one or more PRACH resources associated with SS beam SSm2 (block 665). The GMUE monitors for a BFRP on one or more PRACH response opportunities or resources associated with the one or more PRACH resources used to send the BFRQ (block 667). If the BFRP is received, the GMUE completes beam recovery (block 669). Completion of beam recovery may include rebuilding a physical downlink control channel (PDCCH), and so on.

Figure 7:
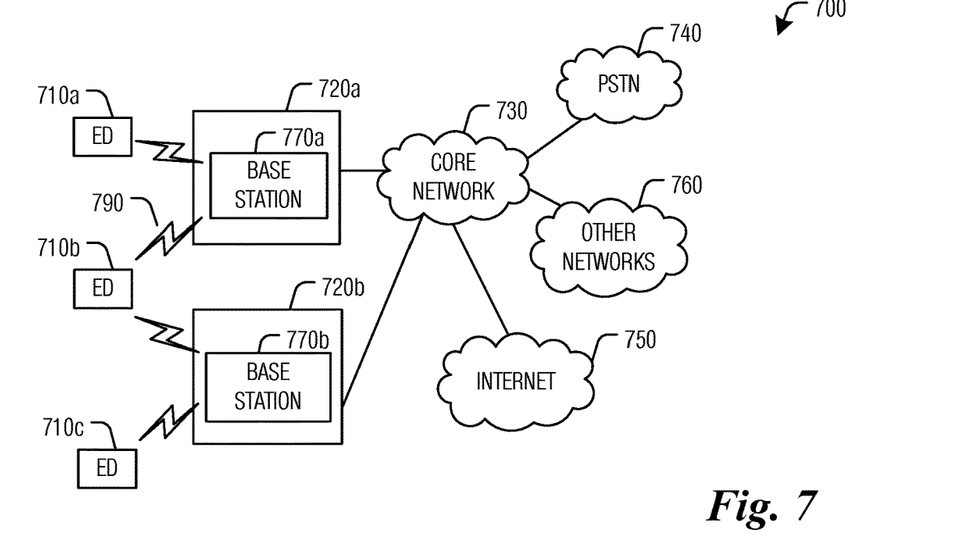
FIG. 7 illustrates an example communication system according to example embodiments described herein.

FIG. 7 illustrates an example communication system 700. In general, the system 700 enables multiple wireless or wired users to transmit and receive data and other content. The system 700 may implement one or more channel access methods, such as code division multiple access (CDMA), time division multiple access (TDMA), frequency division multiple access (FDMA), orthogonal FDMA (OFDMA), single-carrier FDMA (SC-FDMA), or non-orthogonal multiple access (NOMA).

In this example, the communication system 700 includes electronic devices (ED) 710*a*-710*c*, radio access networks (RANs) 720*a*-720*b*, a core network 730, a public switched telephone network (PSTN) 740, the Internet 750, and other networks 760. While certain numbers of these components or elements are shown in FIG. 7, any number of these components or elements may be included in the system 700.

The EDs 710*a*-710*c* are configured to operate and/or communicate in the system 700. For example, the EDs 710*a*-710*c* are configured to transmit and/or receive via wireless or wired communication channels. Each ED 710*a*-710*c* represents any suitable end user device and may include such devices (or may be referred to) as a user equipment/device (UE), wireless transmit/receive unit (WTRU), mobile station, fixed or mobile subscriber unit, cellular telephone, personal digital assistant (PDA), smartphone, laptop, computer, touchpad, wireless sensor, or consumer electronics device.

The RANs 720*a*-720*b* here include base stations 770*a*-770*b*, respectively. Each base station 770*a*-770*b* is configured to wirelessly interface with one or more of the EDs 710*a*-710*c* to enable access to the core network 730, the PSTN 740, the Internet 750, and/or the other networks 760. For example, the base stations 770*a*-770*b* may include (or be) one or more of several well-known devices, such as a base transceiver station (BTS), a Node-B (NodeB), an evolved NodeB (eNodeB), a Home NodeB, a Home eNodeB, a site controller, an access point (AP), or a wireless router. The EDs 710*a*-710*c* are configured to interface and communicate with the Internet 750 and may access the core network 730, the PSTN 740, and/or the other networks 760.

In the embodiment shown in FIG. 7, the base station 770*a* forms part of the RAN 720*a*, which may include other base stations, elements, and/or devices. Also, the base station 770*b* forms part of the RAN 720*b*, which may include other base stations, elements, and/or devices. Each base station 770*a*-770*b* operates to transmit and/or receive wireless signals within a particular geographic region or area, sometimes referred to as a "cell." In some embodiments, multiple-input multiple-output (MIMO) technology may be employed having multiple transceivers for each cell.

The base stations 770*a*-770*b* communicate with one or more of the EDs 710*a*-710*c* over one or more air interfaces 790 using wireless communication links. The air interfaces 790 may utilize any suitable radio access technology.

It is contemplated that the system 700 may use multiple channel access functionality, including such schemes as described above. In particular embodiments, the base stations and EDs implement LTE, LTE-A, and/or LTE-B. Of course, other multiple access schemes and wireless protocols may be utilized.

The RANs 720*a*-720*b* are in communication with the core network 730 to provide the EDs 710*a*-710*c* with voice, data, application, Voice over Internet Protocol (VoIP), or other services. Understandably, the RANs 720*a*-720*b* and/or the core network 730 may be in direct or indirect communication with one or more other RANs (not shown). The core network 730 may also serve as a gateway access for other networks (such as the PSTN 740, the Internet 750, and the other networks 760). In addition, some or all of the EDs 710*a*-710*c* may include functionality for communicating with different wireless networks over different wireless links using different wireless technologies and/or protocols. Instead of wireless communication (or in addition thereto), the EDs may communicate via wired communication channels to a service provider or switch (not shown), and to the Internet 750.

Although FIG. 7 illustrates one example of a communication system, various changes may be made to FIG. 7. For example, the communication system 700 could include any number of EDs, base stations, networks, or other components in any suitable configuration.

Figure 8A:
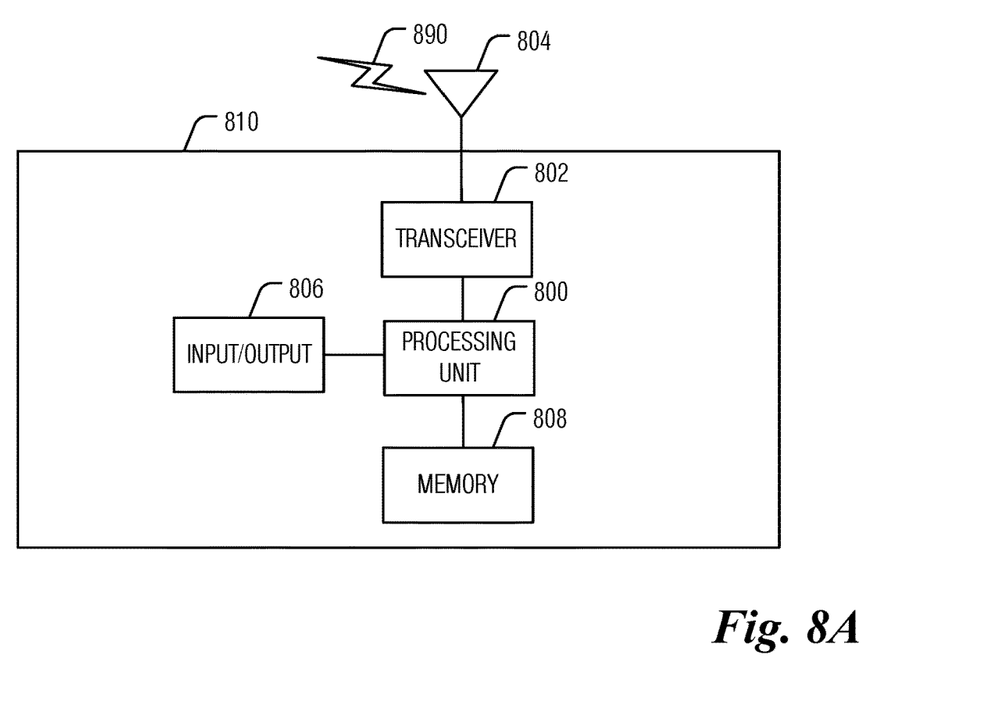
FIGS. 8A and 8B illustrate example devices that may implement the methods and teachings according to this disclosure.
Figure 8B:
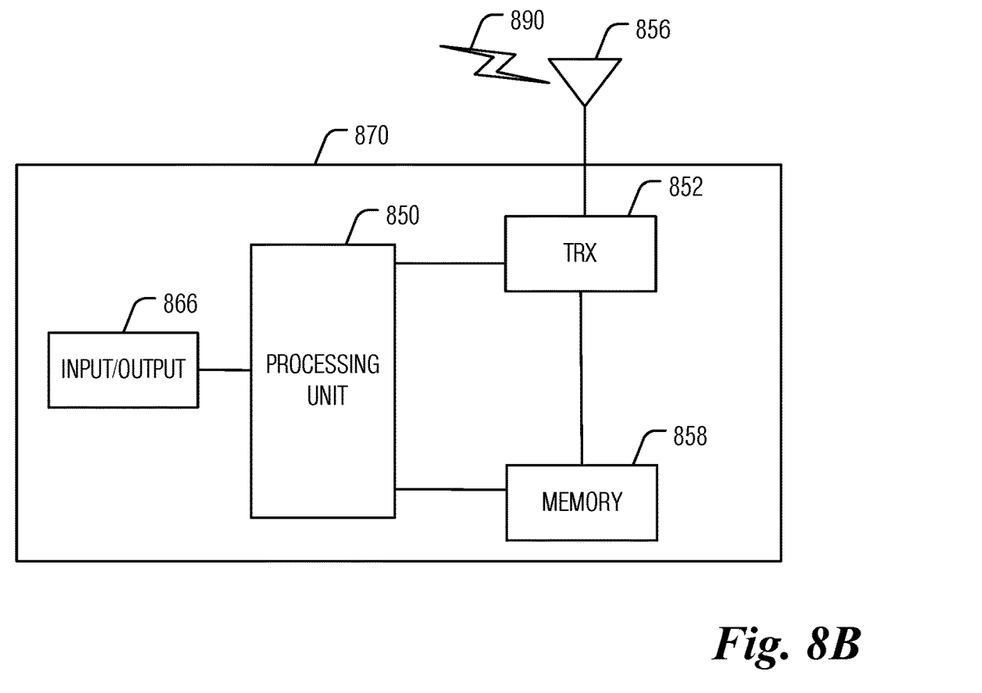

FIGS. 8A and 8B illustrate example devices that may implement the methods and teachings according to this disclosure. In particular, FIG. 8A illustrates an example ED 810, and FIG. 8B illustrates an example base station 870. These components could be used in the system 700 or in any other suitable system.

As shown in FIG. 8A, the ED 810 includes at least one processing unit 800. The processing unit 800 implements various processing operations of the ED 810. For example, the processing unit 800 could perform signal coding, data processing, power control, input/output processing, or any other functionality enabling the ED 810 to operate in the system 700. The processing unit 800 also supports the methods and teachings described in more detail above. Each processing unit 800 includes any suitable processing or computing device configured to perform one or more operations. Each processing unit 800 could, for example, include a microprocessor, microcontroller, digital signal processor, field programmable gate array, or application specific integrated circuit.

The ED 810 also includes at least one transceiver 802. The transceiver 802 is configured to modulate data or other content for transmission by at least one antenna or NIC (Network Interface Controller) 804. The transceiver 802 is also configured to demodulate data or other content received by the at least one antenna 804. Each transceiver 802 includes any suitable structure for generating signals for wireless or wired transmission and/or processing signals received wirelessly or by wire. Each antenna 804 includes any suitable structure for transmitting and/or receiving wireless or wired signals. One or multiple transceivers 802 could be used in the ED 810, and one or multiple antennas 804 could be used in the ED 810. Although shown as a single functional unit, a transceiver 802 could also be implemented using at least one transmitter and at least one separate receiver.

The ED 810 further includes one or more input/output devices 806 or interfaces (such as a wired interface to the Internet 750). The input/output devices 806 facilitate interaction with a user or other devices (network communications) in the network. Each input/output device 806 includes any suitable structure for providing information to or receiving/providing information from a user, such as a speaker, microphone, keypad, keyboard, display, or touch screen, including network interface communications.

In addition, the ED 810 includes at least one memory 808. The memory 808 stores instructions and data used, generated, or collected by the ED 810. For example, the memory 808 could store software or firmware instructions executed by the processing unit(s) 800 and data used to reduce or eliminate interference in incoming signals. Each memory 808 includes any suitable volatile and/or non-volatile storage and retrieval device(s). Any suitable type of memory may be used, such as random access memory (RAM), read only memory (ROM), hard disk, optical disc, subscriber identity module (SIM) card, memory stick, secure digital (SD) memory card, and the like.

As shown in FIG. 8B, the base station 870 includes at least one processing unit 850, at least one transceiver 852, which includes functionality for a transmitter and a receiver, one or more antennas 856, at least one memory 858, and one or more input/output devices or interfaces 866. A scheduler, which would be understood by one skilled in the art, is coupled to the processing unit 850. The scheduler could be included within or operated separately from the base station 870. The processing unit 850 implements various processing operations of the base station 870, such as signal coding, data processing, power control, input/output processing, or any other functionality. The processing unit 850 can also support the methods and teachings described in more detail above. Each processing unit 850 includes any suitable processing or computing device configured to perform one or more operations. Each processing unit 850 could, for example, include a microprocessor, microcontroller, digital signal processor, field programmable gate array, or application specific integrated circuit.

Each transceiver 852 includes any suitable structure for generating signals for wireless or wired transmission to one or more EDs or other devices. Each transceiver 852 further includes any suitable structure for processing signals received wirelessly or by wire from one or more EDs or other devices. Although shown combined as a transceiver 852, a transmitter and a receiver could be separate components. Each antenna 856 includes any suitable structure for transmitting and/or receiving wireless or wired signals. While a common antenna 856 is shown here as being coupled to the transceiver 852, one or more antennas 856 could be coupled to the transceiver(s) 852, allowing separate antennas 856 to be coupled to the transmitter and the receiver if equipped as separate components. Each memory 858 includes any suitable volatile and/or non-volatile storage and retrieval device(s). Each input/output device 866 facilitates interaction with a user or other devices (network communications) in the network. Each input/output device 866 includes any suitable structure for providing information to or receiving/providing information from a user, including network interface communications.

Figure 9:
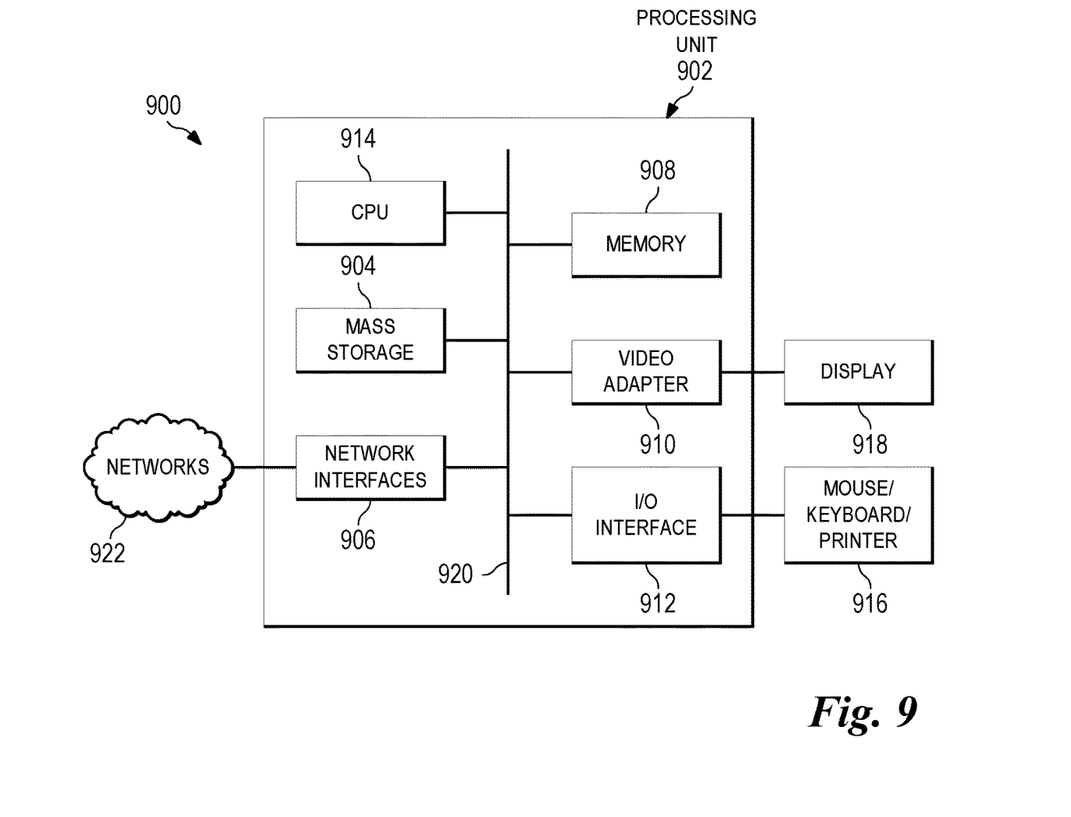
FIG. 9 is a block diagram of a computing system that may be used for implementing the devices and methods disclosed herein.

FIG. 9 is a block diagram of a computing system 900 that may be used for implementing the devices and methods disclosed herein. For example, the computing system can be any entity of UE, access network (AN), mobility management (MM), session management (SM), user plane gateway (UPGW), and/or access stratum (AS). Specific devices may utilize all of the components shown or only a subset of the components, and levels of integration may vary from device to device. Furthermore, a device may contain multiple instances of a component, such as multiple processing units, processors, memories, transmitters, receivers, etc. The computing system 900 includes a processing unit 902. The processing unit includes a central processing unit (CPU) 914, memory 908, and may further include a mass storage device 904, a video adapter 910, and an I/O interface 912 connected to a bus 920.

The bus 920 may be one or more of any type of several bus architectures including a memory bus or memory controller, a peripheral bus, or a video bus. The CPU 914 may comprise any type of electronic data processor. The memory 908 may comprise any type of non-transitory system memory such as static random access memory (SRAM), dynamic random access memory (DRAM), synchronous DRAM (SDRAM), read-only memory (ROM), or a combination thereof. In an embodiment, the memory 908 may include ROM for use at boot-up, and DRAM for program and data storage for use while executing programs.

The mass storage 904 may comprise any type of non-transitory storage device configured to store data, programs, and other information and to make the data, programs, and other information accessible via the bus 920. The mass storage 904 may comprise, for example, one or more of a solid state drive, hard disk drive, a magnetic disk drive, or an optical disk drive.

The video adapter 910 and the I/O interface 912 provide interfaces to couple external input and output devices to the processing unit 902. As illustrated, examples of input and output devices include a display 918 coupled to the video adapter 910 and a mouse/keyboard/printer 916 coupled to the I/O interface 912. Other devices may be coupled to the processing unit 902, and additional or fewer interface cards may be utilized. For example, a serial interface such as Universal Serial Bus (USB) (not shown) may be used to provide an interface for an external device.

The processing unit 902 also includes one or more network interfaces 906, which may comprise wired links, such as an Ethernet cable, and/or wireless links to access nodes or different networks. The network interfaces 906 allow the processing unit 902 to communicate with remote units via the networks. For example, the network interfaces 906 may provide wireless communication via one or more transmitters/transmit antennas and one or more receivers/receive antennas. In an embodiment, the processing unit 902 is coupled to a local-area network 922 or a wide-area network for data processing and communications with remote devices, such as other processing units, the Internet, or remote storage facilities.

It should be appreciated that one or more steps of the embodiment methods provided herein may be performed by corresponding units or modules. For example, a signal may be transmitted by a transmitting unit or a transmitting module. A signal may be received by a receiving unit or a receiving module. A signal may be processed by a processing unit or a processing module. Other steps may be performed by a detecting unit/module, and/or a monitoring unit/module. The respective units/modules may be hardware, software, or a combination thereof. For instance, one or more of the units/modules may be an integrated circuit, such as field programmable gate arrays (FPGAs) or application-specific integrated circuits (ASICs).

Although the present disclosure and its advantages have been described in detail, it should be understood that various changes, substitutions and alterations can be made herein without departing from the spirit and scope of the disclosure as defined by the appended claims.

What is claimed is:

1. A method for operating a first user equipment (UE), the method comprising:
　　receiving, by the first UE, group information comprising:
　　　　group identity information specifying a group identifier of a UE group including the first UE and a second UE,
　　　　UE identity information specifying UEs in the UE group, and
　　　　group lead UE (GLUE) identity information specifying the first UE as a GLUE of the UE group,
　　detecting, by the first UE, a failure of a first link between the first UE and an access node, and based thereon:
　　　　detecting, by the first UE, a second link between the first UE and the access node,
　　　　sending, by the first UE to the access node, a beam failure recovery request (BFRQ) on one or more physical random access channel (PRACH) resources associated with a third link conveying a reference signal, the third link and the second link being quasi co-located (QCLed), and the BFRQ including the group identifier, and monitoring, by the first UE, one or more PRACH response opportunities associated with the one or more PRACH resources for a beam failure recovery response (BFRP).

2. The method of claim 1, further comprising completing, by the first UE, a beam recovery process upon detecting the failure of the first link between the first UE and the access node.

3. The method of claim 2, wherein completing the beam recovery process includes receiving a physical downlink control channel (PDCCH) in accordance with the BFRP.

4. The method of claim 1, further comprising receiving, by the first UE from the access node, a group assignment including the group information.

5. A method for operating a first user equipment (UE), the method comprising:

receiving, by the first UE, group information comprising:
group identity information specifying a group identifier of a UE group including the first UE and a second UE,
UE identity information specifying UEs in the UE group, and
group lead UE (GLUE) identity information specifying the second UE as a GLUE of the UE group, thereby informing the first UE that the first UE is a group member UE (GMUE) of the UE group; and detecting, by the first UE, a failure of a first link between the first UE and an access node, and based thereon:
monitoring, by the first UE, one or more first physical random access channel (PRACH) response opportunities associated with the UE group, for a first beam failure recovery response (BFRP), the first BFRP in response to a first beam failure recovery request (BFRQ) including the group identifier.

6. The method of claim 5, wherein the one or more first PRACH response opportunities are associated with the first link.

7. The method of claim 5, wherein the one or more first PRACH response opportunities are associated with a second link detected between the first UE and the access node.

8. The method of claim 5, further comprising detecting, by the first UE, that the first BFRP is not received within a specified time window or that the first BFRP is not received by the first UE, and based thereon:
detecting, by the first UE, a second link between the first UE and the access node;
sending, by the first UE to the access node, a second BFRQ on one or more PRACH resources associated with a third link conveying a reference signal, the third link and the second link being quasi co-located (QCLed), and the second BFRQ including the group identifier associated with the UE group; and
monitoring, by the first UE, one or more second PRACH response opportunities associated with the one or more PRACH resources for a second BFRP.

9. The method of claim 8, further comprising completing, by the first UE, a beam recovery process upon detecting the failure of the first link between the first UE and the access node.

10. A first user equipment (UE) comprising:
one or more processors; and
a non-transitory computer readable storage medium storing programming for execution by the one or more processors, the programming including instructions to configure the first UE to:
receive group information comprising:
group identity information specifying a group identifier of a UE group including the first UE and at least one other UE,
UE identity information specifying UEs in the UE group, and
group lead UE (GLUE) identity information specifying the first UE as a GLUE of the UE group; and
detect a failure of a first link between the first UE and an access node, and based thereon:
detect a second link between the first UE and the access node,
send to the access node a beam failure recovery request (BFRQ) on one or more physical random access channel (PRACH) resources associated a third link conveying a reference signal, the third link and the second link being quasi co-located (QCLed), and the BFRQ including the group identifier, and
monitor one or more PRACH response opportunities associated with the one or more PRACH resources for a beam failure recovery response (BFRP).

11. The first UE of claim 10, wherein the programming includes instructions to configure the first UE to complete a beam recovery process upon detecting the failure of the first link between the first UE and the access node.

12. The first UE of claim 11, wherein the programming includes instructions to configure the first UE to receive a physical downlink control channel (PDCCH) in accordance with the BFRP.

13. The first UE of claim 10, wherein the programming includes instructions to configure the UE to receive from the access node a group assignment including the group information.

14. A first user equipment (UE) comprising:
one or more processors; and
a non-transitory computer readable storage medium storing programming for execution by the one or more processors, the programming including instructions to configure the first UE to:
receive group information comprising:
group identity information specifying a group identifier of a UE group including the first UE and a second UE,
UE identity information specifying UEs in the UE group, and
group lead UE (GLUE) identity information specifying the second UE as a GLUE of the UE group, thereby informing the first UE that the first UE is a group member UE (GMUE) of the UE group; and
detect a failure of a first link between the first UE and an access node, and based thereon:
monitor one or more first physical random access channel (PRACH) response opportunities associated with the UE group, for a first beam failure recovery response (BFRP), wherein the first BFRP is in response to a first beam failure recovery request (BFRQ) including the group identifier.

15. The first UE of claim 14, wherein the one or more first PRACH response opportunities are associated with the first link.

16. The first UE of claim 14, wherein the one or more first PRACH response opportunities are associated with a second link detected between the first UE and the access node.

17. The first UE of claim 14, wherein the programming includes instructions to configure the first UE to detect that the first BFRP is not received within a specified time window or that the first BFRP is not received by the first UE, and based thereon:
   detect a second link between the first UE and the access node,
   send a second BFRQ on one or more PRACH resources associated with a third link conveying a reference signal, wherein the third link and the second link are quasi co-located (QCLed), wherein the second BFRQ includes the group identifier associated with the UE group, and
   monitor one or more second PRACH response opportunities associated with the one or more PRACH resources for a second BFRP.

18. The first UE of claim 17, wherein the programming includes instructions to configure the first UE to complete a beam recovery process upon detecting the failure of the first link between the first UE and the access node.

* * * * *